US010013385B2

(12) United States Patent
Sanzone et al.

(10) Patent No.: US 10,013,385 B2
(45) Date of Patent: Jul. 3, 2018

(54) PROGRAMMABLE VALIDATION OF TRANSACTION REQUESTS (71) Applicant: Cavium, Inc., San Jose, CA (US)

(72) Inventors: Robert A. Sanzone, Hudson, MA (US); Wilson P. Snyder, II, Holliston, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 449 days.

(21) Appl. No.: 14/540,175

(22) Filed: Nov. 13, 2014

(65) Prior Publication Data
US 2016/0140073 A1    May 19, 2016

(51) Int. Cl.
G06F 13/12  (2006.01)
G06F 13/42  (2006.01)
G06F 21/60  (2013.01)

(52) U.S. Cl.
CPC ........ *G06F 13/4221* (2013.01); *G06F 21/606* (2013.01)

(58) Field of Classification Search
CPC ............... G06F 13/4022; G06F 13/385; G06F 13/4282; G06F 12/1081
USPC .......................................................... 710/110
See application file for complete search history.

(56) References Cited

U.S. PATENT DOCUMENTS

| | | | |
|---|---|---|---|
| 6,134,622 A | 10/2000 | Kapur et al. | |
| 6,226,704 B1 | 5/2001 | Wang et al. | |
| 6,401,192 B1 | 6/2002 | Schroter et al. | |
| 6,412,030 B1 | 6/2002 | Adusumilli | |
| 6,499,077 B1 | 12/2002 | Abramson et al. | |
| 6,516,393 B1 | 2/2003 | Fee et al. | |
| 6,529,991 B1 | 3/2003 | Beukema et al. | |
| 6,546,439 B1 | 4/2003 | Strongin et al. | |
| 6,567,975 B1 | 5/2003 | Damron | |
| 6,629,220 B1 | 9/2003 | Dyer | |
| 6,735,677 B1 | 5/2004 | Stewart | |
| 6,859,208 B1 | 2/2005 | White | |
| 7,124,252 B1 | 10/2006 | Khare et al. | |
| 7,613,850 B1 | 11/2009 | Doering et al. | |
| 8,286,188 B1 | 10/2012 | Brief | |
| 8,601,223 B1 | 12/2013 | Yuan | |
| 8,661,458 B2 | 2/2014 | Sakai | |
| 8,775,754 B2 | 7/2014 | Campbell et al. | |
| 8,832,415 B2 | 9/2014 | Gala et al. | |
| 9,032,162 B1 | 5/2015 | Chang et al. | |
| 9,569,362 B2 | 2/2017 | Sanzone et al. | |
| 2002/0040429 A1 | 4/2002 | Dowling | |
| 2002/0172199 A1 | 11/2002 | Scott et al. | |
| 2003/0126372 A1 | 7/2003 | Rand | |
| 2003/0131204 A1 | 7/2003 | Lin et al. | |
| 2003/0163649 A1 | 8/2003 | Kapur et al. | |
| 2003/0204679 A1 | 10/2003 | Blankenship | |

(Continued)

*Primary Examiner* — Titus Wong
(74) *Attorney, Agent, or Firm* — Hamilton, Brook, Smith & Reynolds, P.C.

(57) ABSTRACT

A data processor includes an input/output bridge that provides enforcement of a security status on transactions between devices across the bridge. The bridge includes circuitry to parse a received request to obtain one or more identifiers, and compare the identifiers against one or more programmable lookup tables. Based on this comparison, the bridge can determine the security status of the transaction, as well as selectively forward the transaction based on the security status.

20 Claims, 6 Drawing Sheets

(56) References Cited

U.S. PATENT DOCUMENTS

| | | |
|---|---|---|
| 2004/0047194 A1 | 3/2004 | MacInnis |
| 2004/0064627 A1 | 4/2004 | Shah et al. |
| 2007/0097950 A1* | 5/2007 | Boyd .................. G06F 13/4022 370/351 |
| 2007/0130372 A1 | 6/2007 | Trish et al. |
| 2007/0165596 A1* | 7/2007 | Boyd .................. G06F 13/4022 370/351 |
| 2007/0168644 A1* | 7/2007 | Hummel ............ G06F 12/1081 711/207 |
| 2007/0204128 A1* | 8/2007 | Lee .................... G06F 12/0246 711/173 |
| 2008/0092211 A1* | 4/2008 | Klemets ............. H04L 63/0823 726/3 |
| 2008/0109565 A1 | 5/2008 | Ajanovic et al. |
| 2008/0137677 A1* | 6/2008 | Boyd .................. G06F 13/385 370/419 |
| 2008/0155560 A1 | 6/2008 | Iwamoto |
| 2008/0243768 A1 | 10/2008 | Freedman et al. |
| 2008/0301256 A1 | 12/2008 | McWilliams et al. |
| 2009/0164694 A1* | 6/2009 | Talayco ............. G06F 13/4022 710/316 |
| 2009/0168784 A1 | 7/2009 | Nakamura et al. |
| 2009/0234987 A1 | 9/2009 | Lee et al. |
| 2009/0254689 A1 | 10/2009 | Karamcheti et al. |
| 2010/0095032 A1 | 4/2010 | Harriman |
| 2011/0022818 A1* | 1/2011 | Kegel ................ G06F 12/1081 711/206 |
| 2011/0072218 A1 | 3/2011 | Manne et al. |
| 2011/0219208 A1 | 9/2011 | Asaad et al. |
| 2011/0225334 A1 | 9/2011 | Byrne et al. |
| 2011/0320743 A1 | 12/2011 | Hagspiel et al. |
| 2011/0320892 A1 | 12/2011 | Check et al. |
| 2012/0020210 A1 | 1/2012 | Sonnier et al. |
| 2012/0173843 A1 | 7/2012 | Kamdar |
| 2013/0103923 A1 | 4/2013 | Pan |
| 2013/0111147 A1 | 5/2013 | Mogul et al. |
| 2013/0132854 A1 | 5/2013 | Raleigh et al. |
| 2013/0163481 A1 | 6/2013 | Ellison et al. |
| 2013/0232279 A1* | 9/2013 | Adar ....................... G06F 13/36 710/3 |
| 2013/0297906 A1 | 11/2013 | Loh et al. |
| 2013/0346697 A1 | 12/2013 | Alexander et al. |
| 2014/0101400 A1* | 4/2014 | Craddock ........... G06F 9/30003 711/162 |
| 2014/0123316 A1 | 5/2014 | Leggette et al. |
| 2014/0201500 A1 | 7/2014 | Niell et al. |
| 2014/0281197 A1 | 9/2014 | Niell et al. |
| 2015/0161257 A1 | 6/2015 | Shivaswamy et al. |
| 2015/0261715 A1* | 9/2015 | Craddock ............... G06F 13/28 710/308 |
| 2015/0278099 A1 | 10/2015 | Jain et al. |
| 2016/0139806 A1 | 5/2016 | Sanzone et al. |
| 2016/0139829 A1 | 5/2016 | Sanzone et al. |

* cited by examiner

| BUS-ID | STATUS |
|--------|--------|
| BUS0 | S |
| BUS1 | NS |
| BUS2 | S |
| ... | ... |
| BUSn | S |

| DEV-ID | STATUS |
|--------|--------|
| DEV0 | NS |
| DEV1 | NS |
| DEV2 | S |
| ... | ... |
| DEVn | NS |

| FUNC-ID | STATUS |
|---------|--------|
| FUNC0 | S |
| FUNC1 | NS |
| FUNC2 | NS |
| ... | ... |
| FUNCn | S |

PROGRAMMABLE VALIDATION OF TRANSACTION REQUESTS

BACKGROUND

Certain processor architectures, such as the ARM® architecture, employ a security extension that characterizes some transactions by a security status, being either "secure" or "non-secure." This characterization allows a processor and associated devices to distinguish between different transactions, as well as to prevent unauthorized access to protected resources and communications. In contrast, certain interconnect or bus architectures, such as Peripheral Component Interconnect Express (PCIe), do not accommodate a comparable security status within their respective transactions.

SUMMARY

Example embodiments of the present disclosure include a circuit configured to control communications between one or more processors and a number of devices. The circuit may include a first port to receive a request from a processor to access a device, as well as a second port to connect to the device and other devices. The request may include identifier and addressing information, including a bus identifier, a device identifier, and a function identifier. The circuit may also include a memory storing a number of lookup tables, such as a bus table, a device table, and a function table. The tables may correlate identifiers of the request to a security status (e.g. secure or non-secure).

The circuit may also include a control circuit configured to compare one or more of the identifiers of the request against a respective table to determine a security status of the request, and may also determine whether the request is permitted in view of the security status. In particular, the control circuit may compare one or both of the bus identifier and the device identifier against the bus table and the device table, respectively, to determine a first security status. The control circuit may also compare the function identifier against the function table to determine a second security status, and may also compare the first and second security statuses to determine whether a mismatch has occurred. Based on one or more of the aforementioned comparisons, the control circuit may selectively forward the request to the device.

In further embodiments, the processor may include an ARM processor, and the request may include a Peripheral Component Interconnect (PCI) transaction, which may be transmitted by a PCI bus. The control circuit may be configured to deny the request under a number of circumstances, such as in response to detecting a mismatch between the security statuses of two or more of the bus identifier, the device identifier, and the function identifier. The control circuit may also deny the request in response to detecting a mismatch between at least one of the bus identifier, a device identifier, and a function identifier and at least one of the bus table, device table and function table.

In still further embodiments, the bus identifier may indicate a given path at which the request is to be forwarded to the device. Likewise, the device indicator may identify the device among the number of devices. The bus table may indicate a security status of the given path (e.g., secure or non-secure). The control circuit may be further configured to deny the request in response to a mismatch between the security status and a status of at least one of the device identifier and the function identifier indicated by the device table and function table, respectively.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments follows.

Figure 1:
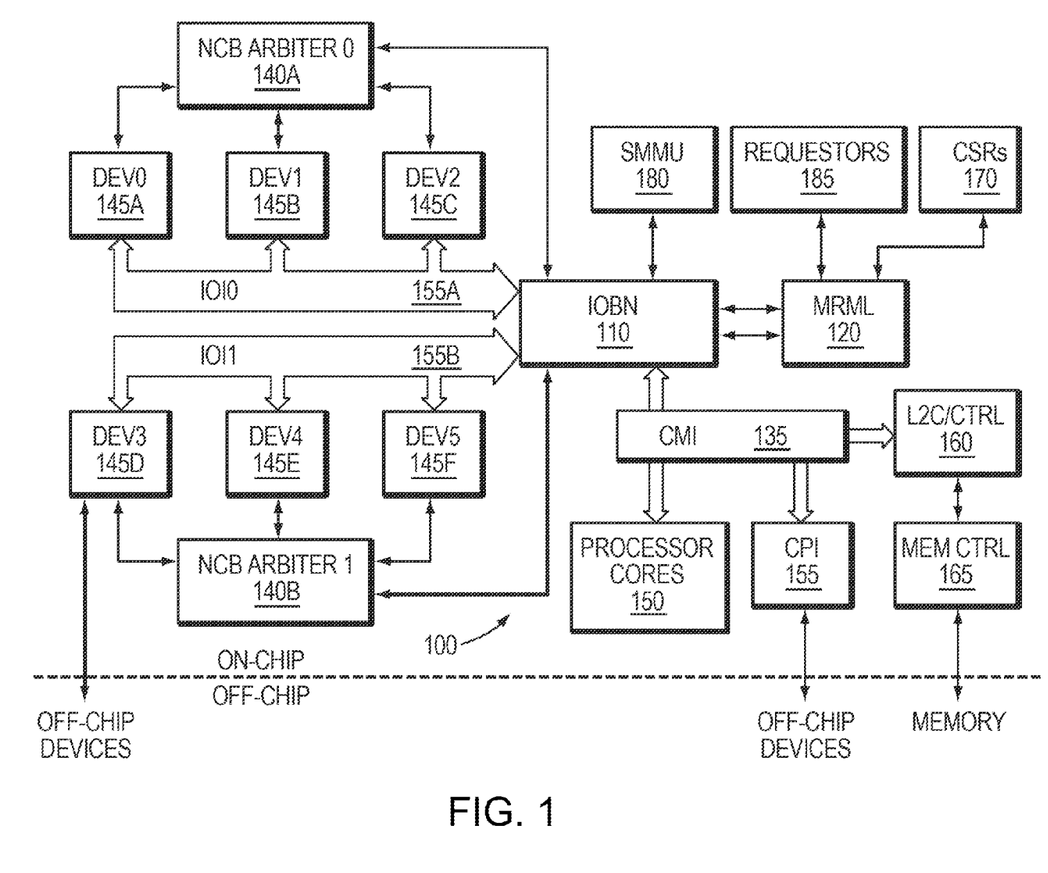
FIG. 1 is a block diagram illustrating a data processor in which embodiments of the present disclosure may be implemented.

FIG. 1 is a block diagram illustrating a data processor 100 in an example embodiment. The processor 100 may be implemented as a system-on-chip (SOC) and connected to external devices, resources and communications channels via a printed circuit board (PCB). Alternatively, the processor 100 may be implemented among a number of discrete circuit components connected via a PCB, or may comprise a SOC in combination with one or more discrete circuit components.

The data processor 100 facilitates operations between a number of devices and resources, and arbitrates access to shared resources among the devices. In particular, the processor cores 150 may include one or more data processor cores. In an example embodiment, the processor cores 150 may include a number (e.g., 48) of ARM® processor cores, such as the ARMv8 processor cores. The processor cores 150 are connected, via a coherent memory interconnect (CMI) 135, to provide shared access to a number of other devices and resources, including the level-2 cache (L2C) and controller 160 (also referred to herein as "L2C"). The L2C further connects to a memory controller 165 for performing memory access operations to an external memory, such as a double data rate synchronous dynamic random-access memory (DDR SDRAM) array. Such a memory (not shown) may alternatively be located on-chip with the data processor 100. The CMI 135 may also connect to a coherent processor interconnect (CPI) 155 for communication with off-chip devices, such as an additional data processor. An example of one such configuration is described below with reference to FIG. 2.

The CMI 135 is further connected to an input/output bridge (IOBN) 110, which provides an interconnect between the processor cores 150, CPI 155 and L2C 160 and additional devices and resources. In particular, devices 145A-F connect to the IOBN 110 via input/output interconnects (IOI), IOI0 155A and IOI1 155B, which may be non-coherent buses (NCBs) including passive and/or arbitrated channels. The devices 145A-F may include a number of different on-chip devices, such as co-processors, and may include I/O interfaces (e.g., USB, SATA, PCIe, Ethernet) to connect to a number of external or off-chip devices and interfaces. In order to arbitrate resources at the IOBN 110 to the devices 145A-F, NCB arbiters 140A-B receive requests from the devices 145A-F and selectively grant IOBN resources to the devices 145A-B. Once granted, the devices 145A-B may communicate with the processor cores 150, perform a memory access operation to the L2C 160, or access other components of the data processor 100.

In order to facilitate shared memory access among several different devices (e.g., the processor cores 150 and devices 145A-F), the data processor 100 may employ virtualization, whereby a memory interconnect (e.g., CMI 135 and IOBN 110) interfaces with the devices using virtual addresses, which are translated to a physical address of the memory. To enable virtualization, a System Memory Management Unit (SMMU) 180 maintains an index of physical and virtual addresses. During a memory access operation where a virtual address is provided, the IOBN 110 forwards the virtual address to the SMMU 180, which returns a corresponding physical address for accessing the memory (e.g., the L2C 160 or an external memory via the L2C 160). The IOBN 110 may translate addresses bi-directionally such that the virtual address is maintained at communications at the device, and the physical address is indicated in operations at the memory. The SMMU 180 may be further configured to support multiple tiers of virtual addresses.

Control status registers (CSRs) 170 include registers for maintaining information about the instructions and operations of the data processor 100. The CSRs may maintain, for example, status information regarding a number of devices, as well as information about ongoing operations and instructions between devices and/or resources. Devices such as the processor cores 150 and the devices 145A-B, as well as other requestors 185 and off-chip devices (via the CPI 155), may write to and read from the CSRs 170 using a register master logic (RML). To facilitate the multiple requests from several different devices, a master RML (MRML) 120 operates to arbitrate access to the CSRs 170.

Figure 2:
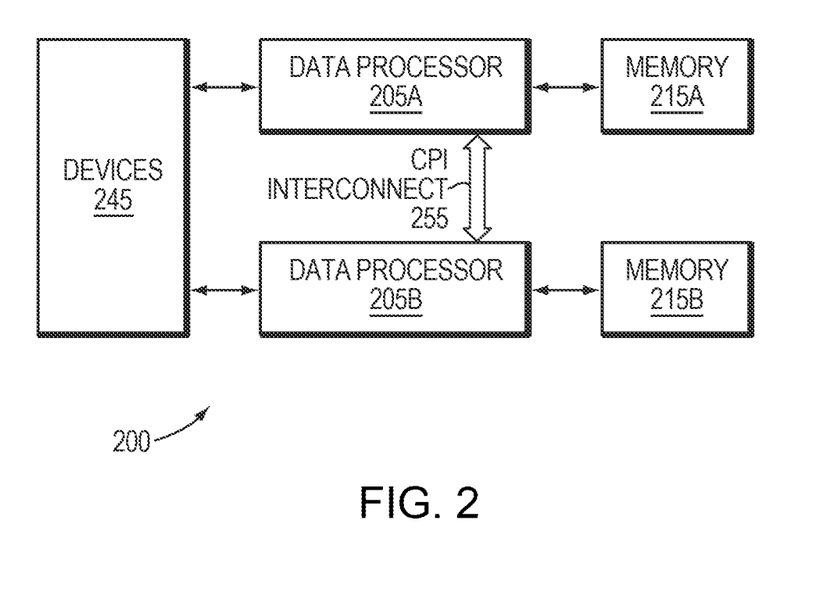
FIG. 2 is a block diagram illustrating a system implementing the data processor of FIG. 1.

FIG. 2 is a block diagram illustrating a system 200 implementing a plurality of data processors. The system 200 includes data processors 205A-B, each of which may be configured comparably to the data processor 100 described above with reference to FIG. 1. The data processors 205A-B may be linked by a CPI interconnect 255, which may connect to a respective CPI interface (e.g., 155 in FIG. 1) of each data processor 205A-B. The CPI interconnect 255 may provide shared access to the devices and resources across the data processors 201A-B. In further embodiments, additional data processors or other devices may be linked to the data processors 205A-B via the CPI interconnect 255.

The data processors 205A-B may be connected to respective memory arrays (e.g., DDR SDRAM) 215A-B as shown, and/or may be connected to a common memory array. The data processors may be further connected to a number of external devices 245 via a number of devices via respective I/O interfaces (e.g., USB, SATA, PCIe, Ethernet).

Turning back to FIG. 1, in some embodiments as described above, the processor cores 150 may include one or more processors, such as ARMv8 processors, that employ a security extension for certain transactions. For example, the processor cores 150 may describe transactions with target devices 145A-F as either "secure" or "non-secure." Such a description may be incorporated into outgoing transactions by the processor cores 150, and the processor cores 150 may likewise require incoming transactions to include such descriptions or another indicator by which their security status can be ascertained.

In contrast, the processor cores 150 may communicate with the devices 145A-F via channels that do not support a security descriptor. For example, one or more of the devices 145A-F may connect to the IOBN 110 via a peripheral component interconnect (PCI) interface (or, similarly, a PCI express (PCIe) interface), and may communicate via PCI transactions. However, the PCI communications standard does not accommodate security descriptors compatible with those employed under ARM architecture.

To facilitate communications between the processor cores 150 and the devices 145A-F, the IOBN 110 may be configured to determine a security status of a transaction, as well as determine, based on the security status, whether the transaction is legal or illegal. The IOBN 110 may then, based on one or more such determinations, selectively forward the transaction toward its destination. An example IOBN 110 configured to provide the aforementioned functions is described below with reference to FIG. 3.

Figure 3:
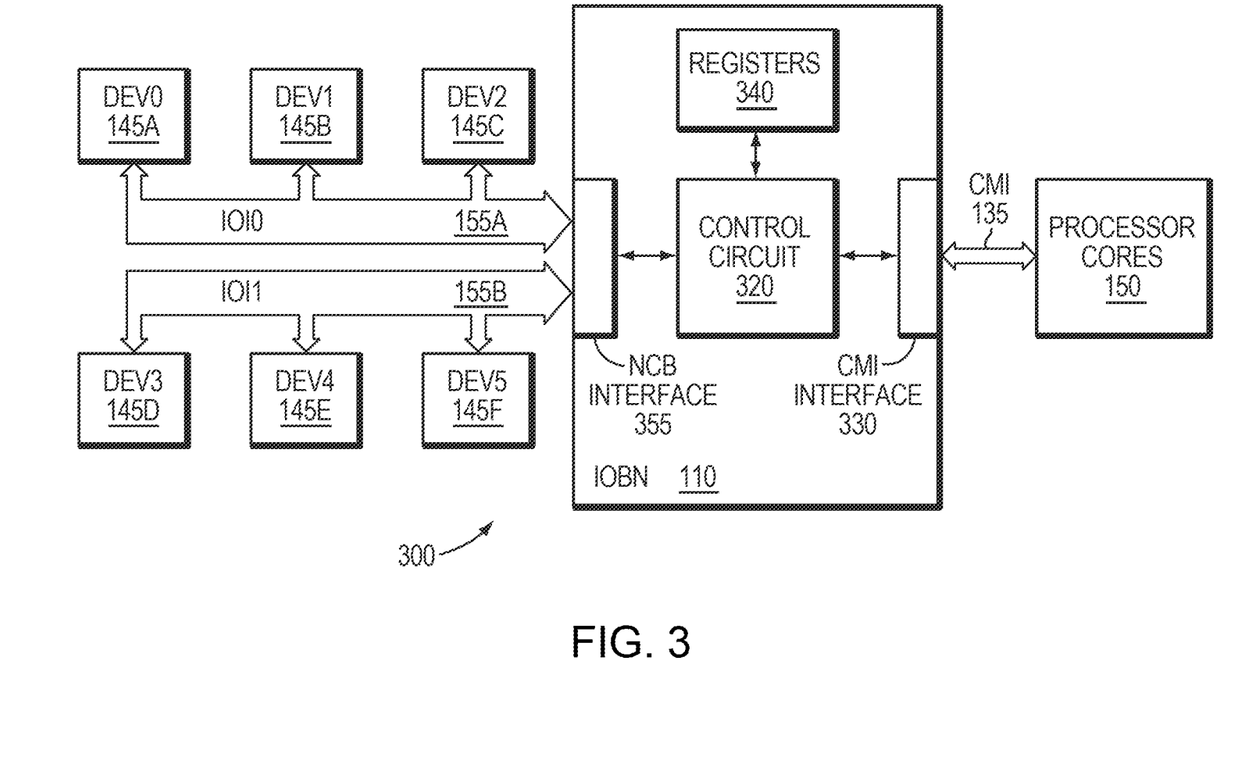
FIG. 3 is a block diagram illustrating an input/output bridge connecting a plurality of processor cores and a plurality of devices in one embodiment.

FIG. 3 is a block diagram illustrating a processing subsystem 300 including an IOBN 110 connecting a plurality of processor cores 150 and a plurality of devices 145A-F in one embodiment. The subsystem 300 may include one or more components of the data processor 100 described above with reference to FIG. 1, or may be incorporated into the data processor.

The IOBN 110 includes a non-coherent bus (NCB) interface 355 for communicating with the devices 145A-F via intermediary NCBs, IOI0 155A and IOI1 155B. The IOBN 110 also includes a CMI interface 330 for communicating with the processor cores 150 via the CMI 135. The IOBN 110 further includes a control circuit 320 and registers 340. Alternatively, the registers 340 may be located separately from the IOBN 110.

The processor cores 150 may forward requests to the IOBN 110 that address one or more of the devices 145A-B. The processor cores 150 may classify such transactions as either secure or non-secure, yet may not be permitted to include a descriptor indicating as such in the transaction itself. As described above, this limitation may be due to the architecture of the channels carrying the request. For example, one or more of the devices 145A-F may connect to the IOBN 110 via a PCI or PCIe interface, which does not accommodate security descriptors.

The IOBN 110 may provide for enforcement of secure and non-secure transactions despite the aforementioned limitations of channels within the subsystem 300. To do so, the control circuit 320 may operate to classify a request from the processor cores 150 as "secure" or "non-secure" based on a comparison of elements of the request against one or more lookup tables stored at the registers 340. The control circuit may also determine whether the transaction is "legal" or "illegal" based on a comparison of the security statuses of the transaction and a destination bus and/or device. Based on the above determinations, the control circuit may selectively forward or deny the transaction.

Figure 4:
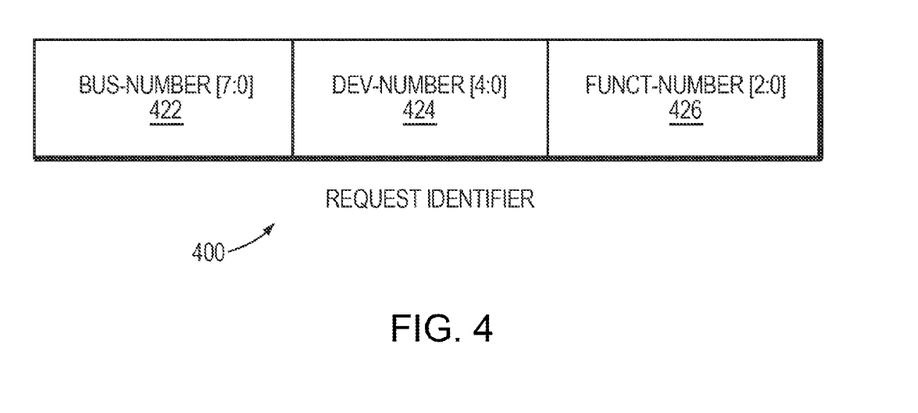
FIG. 4 illustrates an example requestor identifier structure.

FIG. 4 illustrates an example request identifier 400 structure. The request identifier 400 may be a component of a request transaction forwarded by the processor cores 150 to the IOBN 110 as described above with reference to FIG. 3. The request identifier 400 may include a bus identifier 422 (e.g., 8 bits), a device identifier 424 (e.g., 5 bits), and a function identifier 426 (e.g., 3 bits). The bus identifier 422 may indicate a bus (e.g., a physical and/or logical path) through which the request is to travel to reach a destination device. The device identifier 424 may identify the device originating the request, or may identify the destination device, or may identify both the requesting and destination devices (e.g., a device identifier including both a requestor identifier and a destination idenfier). Further, the function identifier may classify the function associated with the request. The example request identifier 400 generally coincides with a request identifier employed in PCI transactions. In further embodiments, the processor cores 150 may provide a request identifier under a different configuration. For example, the request identifier may include a bus identifier and a function identifier of different lengths (e.g., 8 bits each), while excluding a device identifier. Such a configuration may also be supported under PCI architecture.

Figure 5A:
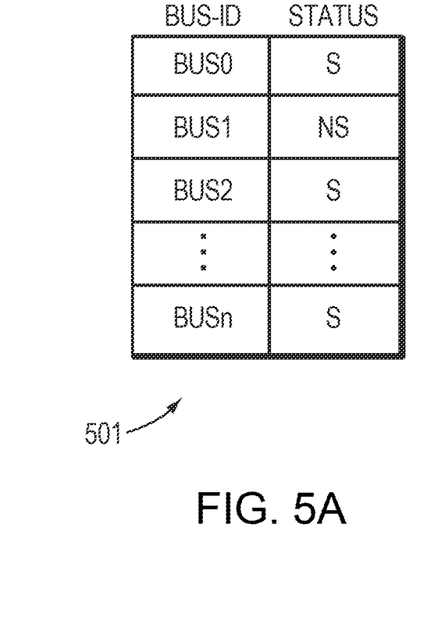
FIGS. 5A-C illustrate example table structures for indicating security status.
Figure 5B:
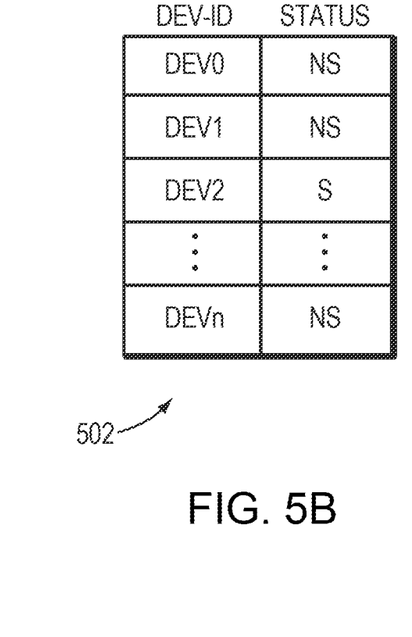
Figure 5C:
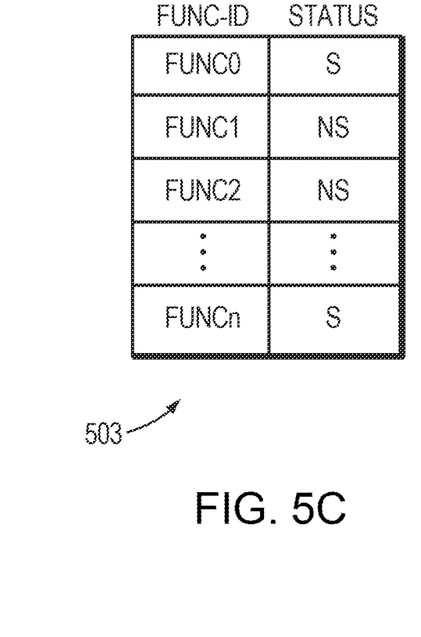

FIGS. 5A-C illustrate example table structures 501-503 for indicating security status. The tables 501-503 may be stored, for example, within the register 340 described above with reference to FIG. 3. As shown in FIG. 5A, a bus table 501 indexes bus identifiers (BUS0 . . . BUSn) by a respective security status (e.g., "S" indicates "secure"; "NS" indicates "non-secure"). FIG. 5B illustrates a device table 502 that indexes device identifiers (DEV0 . . . DEVn) by a respective security status. Likewise, FIG. 5C shows a function table 503 that indexes function identifiers (FUNC0 . . . FUNCn) by a respective security status. Each of the tables 501-503 may be programmed to accommodate a number of different hardware and software configurations. For example, a selected subset of devices may be classified as secure, and can be designated as such by the device table 502. A result of such classification may be to insulate the secure devices from non-secure transactions, and/or transactions originating from non-secure devices or buses. Likewise, a selected subset of buses may be classified as secure as indicated by the bus table 501, which may ensure that only secure traffic is transmitted across the secure buses.

Figure 6:
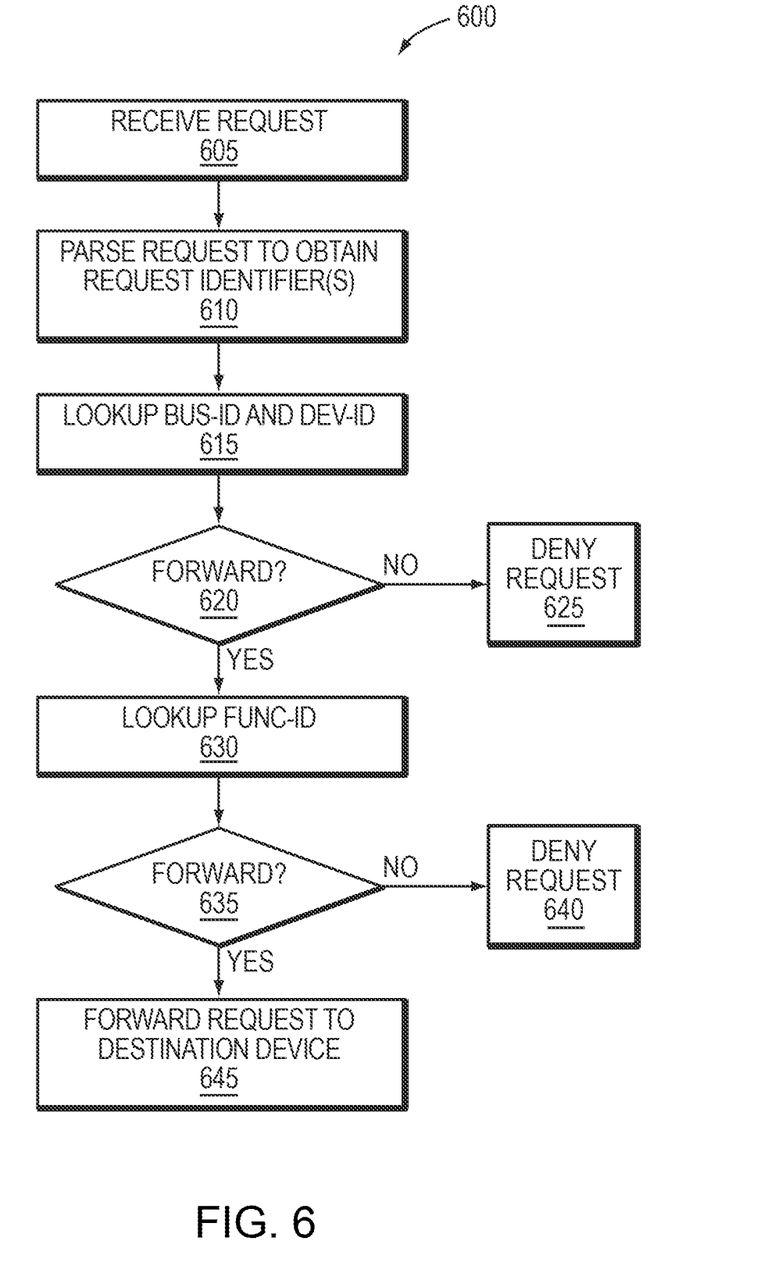
FIG. 6 is a flow chart illustrating processing of a request in one embodiment.

FIG. 6 is a flow chart illustrating a process 600 of determining and enforcing security status in one embodiment. With reference to FIG. 3, The IOBN 110 receives a request (e.g., request 400 in FIG. 4) from a processor core 150 to forward a transaction to one of the devices 145A-F (605). The IOBN 110 parses the request to obtain a corresponding request identifier, which may include, for example, a bus identifier, a device identifier, and a function identifier (610). The control circuit 320 of the IOBN 110 may perform an initial filtering of the request by comparing the bus identifier and device identifier of the request identifier against corresponding lookup tables (e.g., lookup tables 501, 502 in FIGS. 5A-B) (615). Based on the above comparisons, the control circuit 320 may determine whether to forward or deny the request (620). Such a determination may be configured based on a given security enforcement design. For example, the control circuit may compare the security statuses of the bus identifier and the device identifier and, upon detecting a mismatch (e.g., detecting both secure and non-secure statuses), determine that the request is illegal, and deny the request (625).

If the request is forwarded, the request may undergo additional filtering, whereupon the function identifier is compared against a lookup table (e.g., function table 503 in FIG. 5C) (630). Based on this comparison, the control circuit 320 may again determine whether to forward or deny the request (635). For example, the control circuit may compare the security status of the function identifier against the security statuses of the bus identifier and the device identifier and, upon detecting a mismatch, deny the request (640). If the request is determined to be legal (e.g., no mismatch between security statuses), then the IOBN 110 may forward the request to the destination device (645)

In further embodiments, with reference to FIG. 3, operations of the control circuit 320 may be distributed among two or more modules to provide tiered filtering of received requests as shown for example in FIG. 6 (i.e., operations 620, 635).

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling access, comprising:
receiving a request from a processor to access at least one of a plurality of devices;
parsing an address portion of the request to obtain a bus identifier, a device identifier, and a function identifier;
comparing at least one of the bus identifier and the device identifier against a bus table and a device table, respectively, to determine a first security status;
comparing the function identifier against a function table to determine a second security status, the second security status indicating whether the function identifier corresponds to a class of secure functions;
comparing the first security status against the second security status; and
selectively forwarding the request to the at least one of the plurality of devices based on whether the first security status matches the second security status.

2. The method of claim 1, wherein the processor is an ARM processor.

3. The method of claim 1, wherein the request includes a Peripheral Component Interconnect (PCI) transaction.

4. The method of claim 3, wherein selectively forwarding the request includes transmitting the PCI transaction via a PCI bus.

5. The method of claim 1, wherein selectively forwarding the request includes denying the request in response to detecting a mismatch between at least two of the bus identifier, the device identifier, and the function identifier.

6. The method of claim 1, wherein selectively forwarding the request includes denying the request in response to detecting a mismatch between at least one of the bus identifier, a device identifier, and a function identifier and at least one of the bus table, device table and function table.

7. The method of claim 1, wherein the bus identifier indicates a given path at which the request is to be forwarded to the at least one of the plurality of devices.

8. The method of claim 7, wherein the bus table indicates a security status of the given path, the security status being secure or non-secure.

9. The method of claim 8, wherein selectively forwarding the request includes denying the request in response to a mismatch between the security status and a status of at least one of the device identifier and the function identifier indicated by the device table and function table, respectively.

10. The method of claim 1, wherein the device identifier indicates the at least one of the plurality of devices.

11. A circuit for controlling access, comprising:
a first port configured to receive a request from a processor to access at least one of a plurality of devices, the request including a bus identifier, a device identifier, and a function identifier;

a second port configured to connect to the plurality of devices via a bus;

a memory storing a bus table, a device table, and a function table; and a control circuit configured to:

compare at least one of the bus identifier and the device identifier against the bus table and the device table, respectively, to determine a first security status;

compare the function identifier against the function table to determine a second security status, the second security status indicating whether the function identifier corresponds to a class of secure functions;

compare the first security status against the second security status; and selectively forward the request to the at least one of the plurality of devices based on whether the first security status matches the second security status.

12. The circuit of claim 11, wherein the processor is an ARM processor.

13. The circuit of claim 11, wherein the request includes a Peripheral Component Interconnect (PCI) transaction.

14. The circuit of claim 13, wherein the control circuit is further configured to transmit the PCI transaction via a PCI bus.

15. The circuit of claim 11, wherein the control circuit is further configured to deny the request in response to detecting a mismatch between at least two of the bus identifier, the device identifier, and the function identifier.

16. The circuit of claim 11, wherein the control circuit is further configured to deny the request in response to detecting a mismatch between at least one of the bus identifier, a device identifier, and a function identifier and at least one of the bus table, device table and function table.

17. The circuit of claim 11, wherein the bus identifier indicates a given path at which the request is to be forwarded to the at least one of the plurality of devices.

18. The circuit of claim 17, wherein the bus table indicates a security status of the given path, the security status being secure or non-secure.

19. The circuit of claim 18, wherein the control circuit is further configured to deny the request in response to a mismatch between the security status and a status of at least one of the device identifier and the function identifier indicated by the device table and function table, respectively.

20. The circuit of claim 11, wherein the device identifier indicates the at least one of the plurality of devices.

* * * * *